(12) United States Patent
Mitamura

(10) Patent No.: US 6,322,342 B1
(45) Date of Patent: Nov. 27, 2001

(54) TIRE VULCANIZER

(75) Inventor: Hisashi Mitamura, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/312,716

(22) Filed: May 17, 1999

(30) Foreign Application Priority Data

May 18, 1998 (JP) .................................................. 10-134911

(51) Int. Cl.[7] .................................................. B29C 35/02
(52) U.S. Cl. ........................ 425/28.1; 264/236; 425/58.1
(58) Field of Search ................................. 425/28.1, 58.1, 425/74; 264/502, 236, 237

(56) References Cited

U.S. PATENT DOCUMENTS

| | | | | |
|---|---|---|---|---|
| 2,314,726 | * | 3/1943 | Moore et al. ........................ | 425/28.1 |
| 3,219,737 | * | 11/1965 | Kilgore ................................. | 264/502 |
| 3,233,020 | * | 2/1966 | Meumann ............................ | 264/502 |
| 3,529,048 | * | 9/1970 | Kovac et al. ........................ | 425/34.1 |
| 3,632,701 | * | 1/1972 | Devitt et al. ........................ | 264/502 |
| 3,645,660 | * | 2/1972 | Hugger et al. ...................... | 425/58.1 |
| 3,692,444 | * | 9/1972 | Hugger et al. ...................... | 425/58.1 |
| 3,783,241 | * | 1/1974 | Cimprich ............................ | 425/28.1 |
| 3,838,142 | * | 9/1974 | Hochstein ............................ | 264/502 |
| 3,872,208 | * | 3/1975 | Brown et al. ........................ | 264/502 |
| 5,204,049 | * | 4/1993 | Siegenthaler ...................... | 425/58.1 |
| 5,250,252 | * | 10/1993 | Siegenthaler ...................... | 425/58.1 |
| 5,384,084 | * | 1/1995 | Siegenthaler ...................... | 425/58.1 |

FOREIGN PATENT DOCUMENTS

| | | | | |
|---|---|---|---|---|
| 604984 | * | 7/1994 | (EP) ................................. | 425/58.1 |
| 06-246751 | | 9/1994 | (JP) . | |
| 94-3696 | | 3/1994 | (KR) . | |

\* cited by examiner

Primary Examiner—James P. Mackey
(74) Attorney, Agent, or Firm—Oblon, Spivak, McClelland, Maier & Neustadt, P.C.

(57) ABSTRACT

A green tire is partially vulcanized as primary vulcanization by a tire vulcanizer. Then the primnarily vulcanized tire is entirely vulcanized as secondary vulcanization by a post-cure inflator. This enables to shorten the cycle time for tire vulcanization by simultaneously applying vulcanization by the tire vulcanizer and the post-cure inflator in parallel to improve the productivity.

20 Claims, 11 Drawing Sheets

TIRE VULCANIZER

BACKGROUND OF THE INVENTION

1. Field of the Invention

The present invention concerns a tire vulcanization method and a tire vulcanizer for molding green tires by vulcanization.

2. Description of the Related Art

Tires are generally vulcanized by loading a green tire (unvulcanized tire) into a mold of a tire vulcanizing press and blowing a heating medium into the green tire to cause denaturation of rubber by heating.

However, as shown in a cross sectional view of FIG. 11, since the thickness of a tire is not uniform, vulcanizing time is determined based on the temperature elevation in a thick walled portion such as a tread part R or a bead part V in order to prevent occurrence of unvulcanized tire in a tire vulcaniing press. Therefore, even when the temperature at the inside and the outside of a side wall part S, that is, a thin walled portion of a green tire reaches a vulcanizing temperature, it has to be waited till the inside of the tread part R or the bead part V as the thick wall portion reaches the vulcanizing temperature. This leads to increase of the production cost due to the loss of heat energy during the waiting period, as well as the cycle time for the tire vulcanization is also prolonged to lower the productivity.

SUMMARY OF THE INVENTION

It is an object of the present invention to provide a tire vulcanization method and a tire vulcanizer capable of shortening the cycle time for the tire vulcanization thereby improving the productivity.

In the tire vulcanization method and the tire vulcanizer according to the present invention, primary vulcanization is applied by heating a green tire in a vulcanizing press and secondary vulcanization is applied to the primarily vulcanized tire at the outside of the tire vulcanizing press.

Since the vulcanization molding for a green tire is not applied entirely in the tire vulcanizing press but applied by the primary vulcanization for the green tire and the secondary vulcanization for the primarily vulcanized tire separately, the vulcanizing process can be conducted in parallel, the time for staying the tire at one place is shortened thereby enabling to shorten the cycle time for the tire vulcanization in total.

If the temperature of the primarily vulcanized tire is adiabatically kept in the secondary vulcanizing step, the secondary vulcanization can be conducted with a capacity of heat stored in the primary vulcanization.

Further, it is preferred that substances formed by the vulcanizing reaction of the primarily vulcanized tire are recovered/removed in the secondary vulcanizing step.

After the secondary vulcanizing step, the secondarily vulcanized tire is cooled. The cooling can be conducted by a cooling means disposed separately from or integrally with the secondary vulcanization means. Further, a portion of a plurality of vulcanizing positions having the secondary vulcanization means can also be used as the cooling means.

When the primarily vulcanized tire is heated to an elevated temperature in the secondary vulcanizing step, the vulcanizing reaction for the tire can be promoted. Further, for heating to elevate the temperature of the primarily vulcanized tire, it can be adopted means for blowing air heated by a heat energy of waste gases exhausted from the tire vulcanizing press to the primarily vulcanized tire, means for heating the primarily vulcanized tire by a heater and like other heating means, or a combination thereof.

DESCRIPTION OF THE PREFERRED EMBODIMENTS

A tire vulcanization method and a tire vulcanizer according to the present invention are to be explained.

In the tire vulcanization method and the tire vulcanizer according to the present invention, primary vulcanization is applied to a green tire by a tire vulcanizing press and secondary vulcanization is applied to the primarily vulcanized tire at the outside of the tire vulcanizing press. Since the primary vulcanization and the secondary vulcanization to the green tire are conducted separately, the vulcanizing process can be applied in parallel and the time for staying the tire at one place can be shortened to shorten the cycle time for the tire vulcanization and improve the productivity.

Explanations will be made at first to a tire vulcanizer in a preferred embodiment of the present invention and then to the tire vulcanization method.

Figure 1:
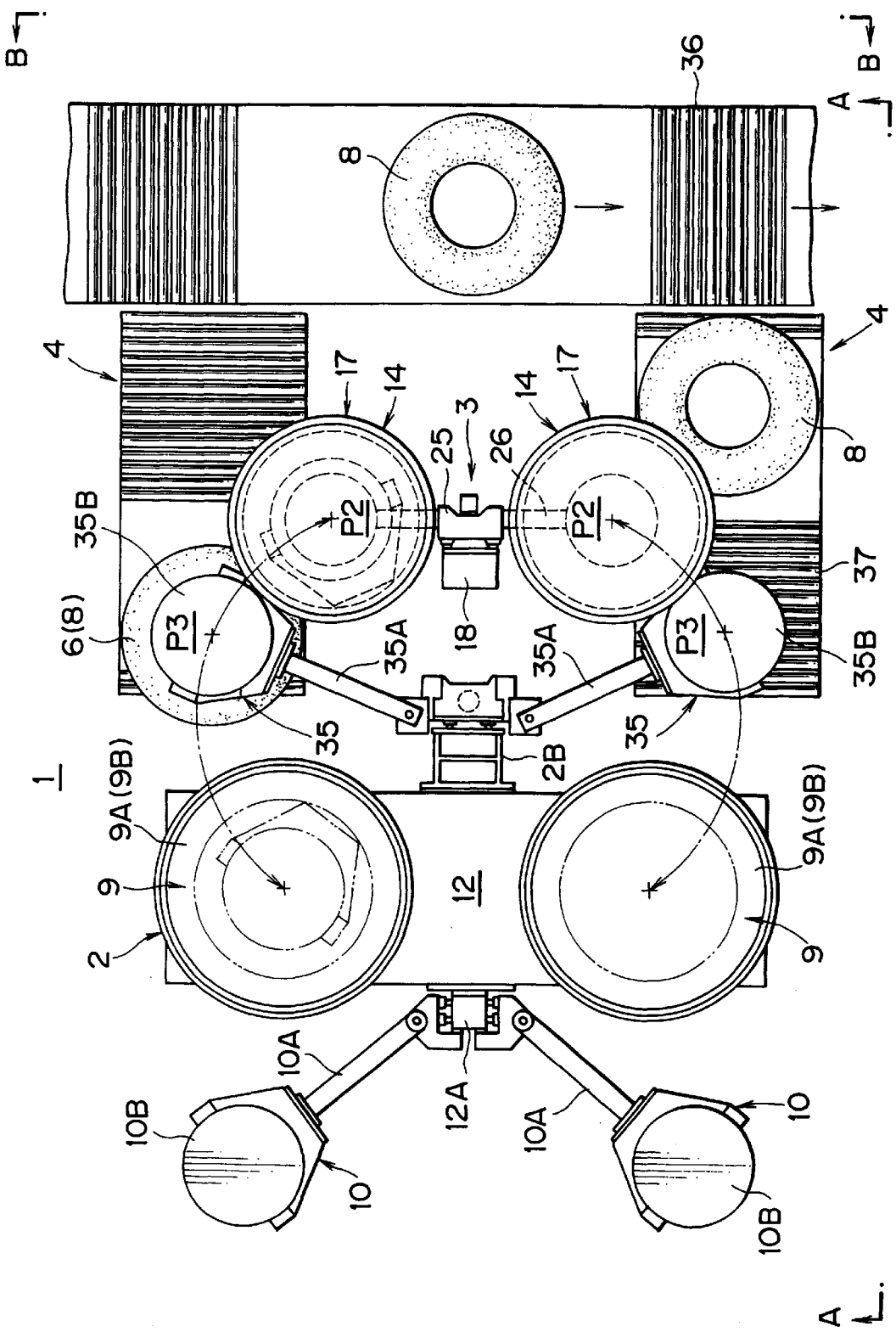
FIG. 1 is an upper plan view showing an entire constitution of a tire vulcanizer.
Figure 2:
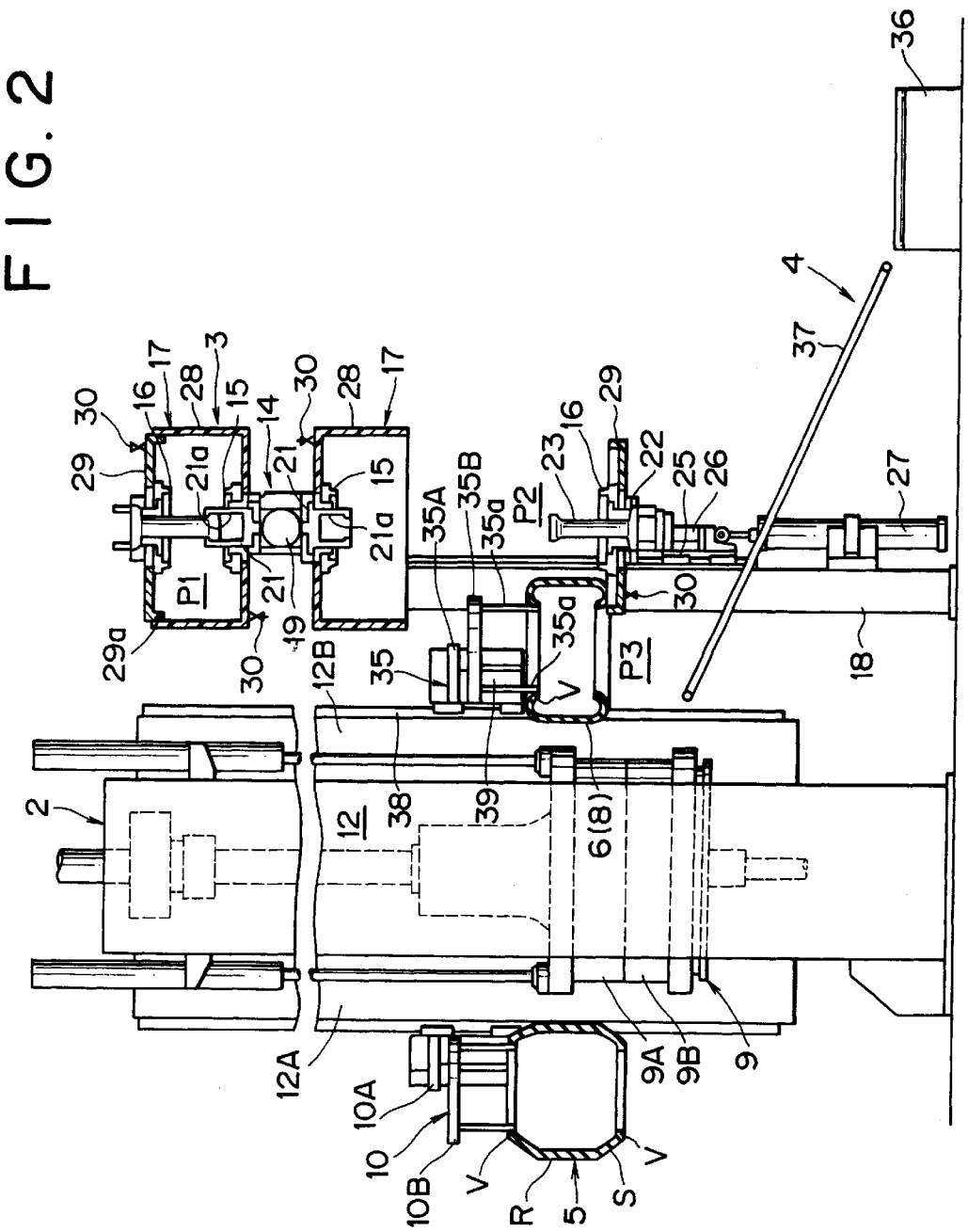
FIG. 2 is a side elevational view showing an entire constitution of a tire vulcanizer taken along line A—A in FIG. 1.
Figure 3:
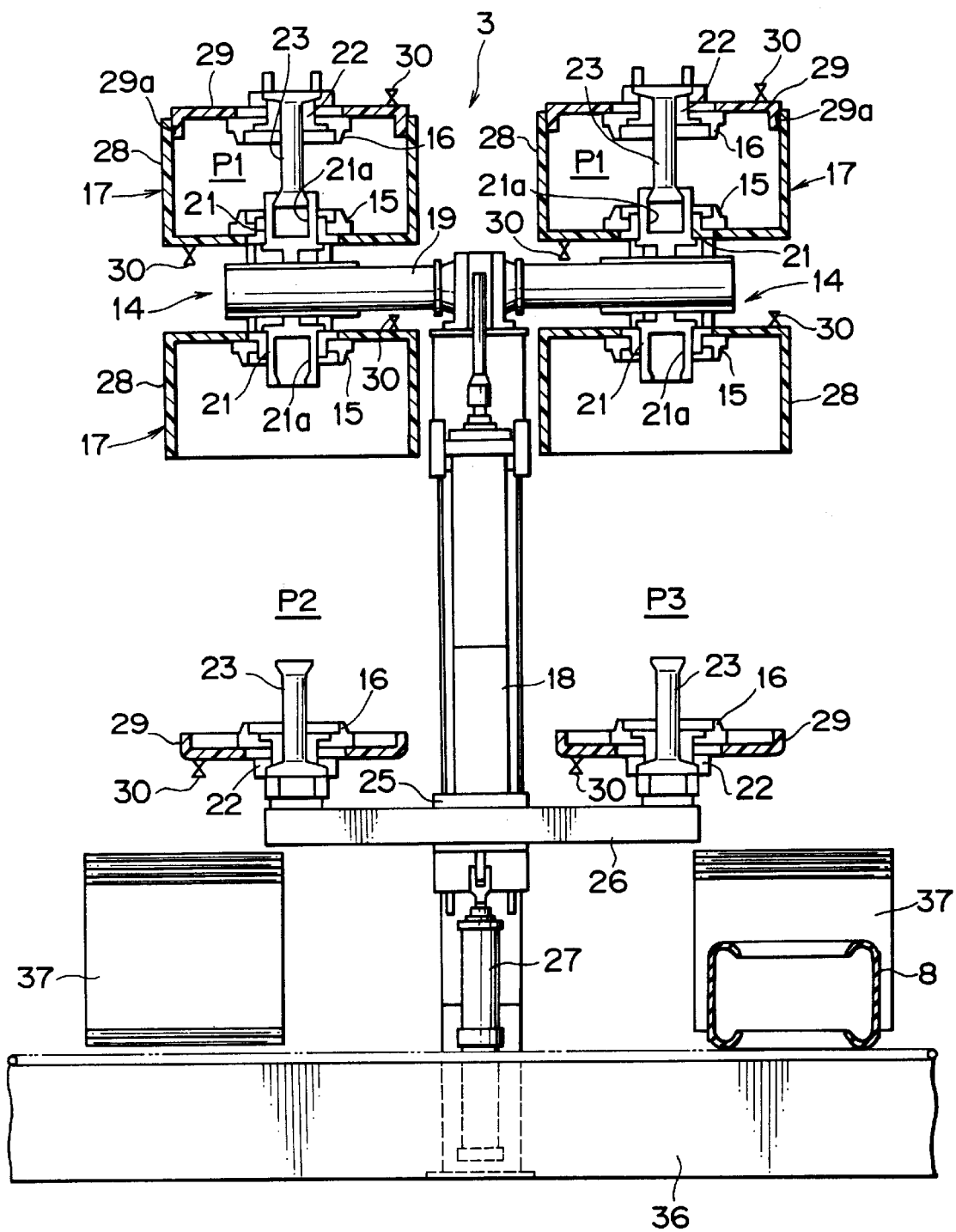
FIG. 3 is a rear elevational view showing an entire constitution of a tire vulcanizer taken along line B—B in FIG. 1.

A tire vulcanizer 1 shown in FIG. 1 to FIG. 3 comprises a tire vulcanizing press 2 for applying primary vulcanization to a green tire 5, a secondary vulcanizing mechanism 14 constituted with heat insulators 17 comprising a vessel main body 28 disposed on an upper rim 15 and a lid 29 disposed on a lower rim 16 of a post-cure inflator 3 for applying, at the outside of the tire vulcanizing pressing, secondary vulcanization to a tire 6 applied with primary vulcanization Hereinafter referred as "primarily vulcanized tire 6") and a conveying means 4 for conveying the primarily vulcanized tire 6 and the like.

A tire vulcanizing press 2 capable of applying primary vulcanization to two green tires simultaneously is shown. The tire vulcanizing press 2 comprises two molds 9 (die) for molding green tires 5 simultaneously by vulcanization, and two entry loads 10 for entering the green tire 5 under rotation to the respective molds 9. Each mold 9 has upper and lower molds 9A and 9B which can be opened and closed vertically. Each upper mold 9A is vertically movable by a plurality of lift cylinders secured to a vulcanizer frame 12 and is opened an closed relative to each mold 9B secured to the vulcanizer frame 12. Each entry load 10 is disposed vertically movably and rotatably to a guide support 12A disposed vertically at a central position on the front surface of the vulcanizer frame 12, and enters the green tire 5 under rotation into each mold 9 while gripping an upper bead part V of the tire by a tire chuck 10B at the top end of a rotary arm 10A (refer to FIG. 2).

Figure 4A:
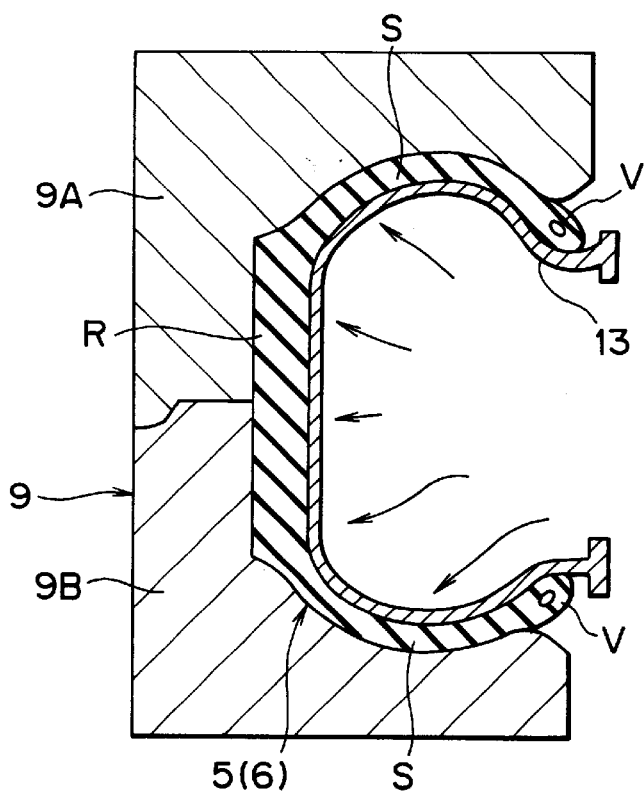
FIG. 4a and FIG. 4b are enlarged views each for a main portion showing the state of primary vulcanization in a tire vulcanizing press.
Figure 4B:
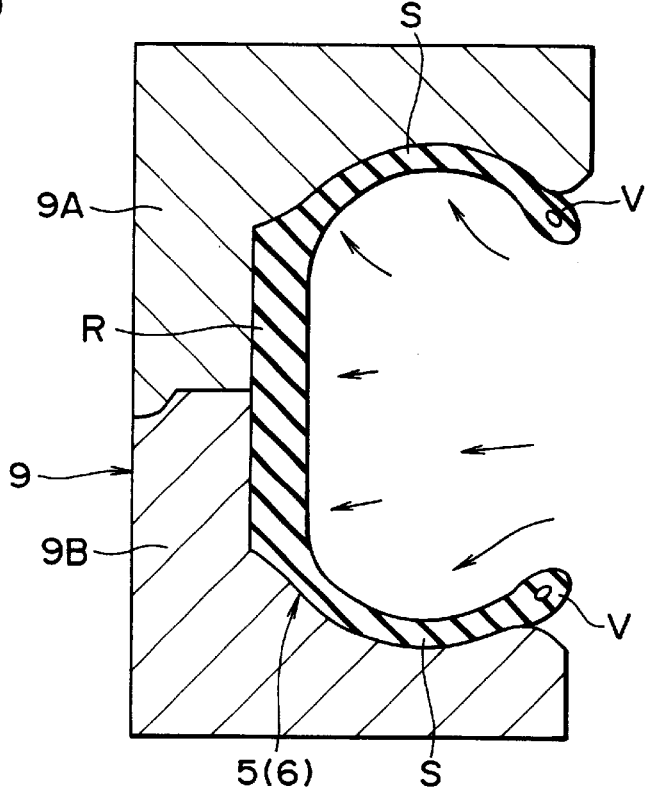

As shown in FIG. 4a, the tire vulcanizing press 2 grips the green tire 5 at each entry load 10 and loads it between the upper and lower molds 9A and 9B in an open state and, at the same time, inserts a bladder 13 (flexible bag) to the inside of the green tire 5. After closing each mold 9, a pressurized heating medium is blown into the bladder 13, thereby urging the green tire 5 to the mold 9 and forming it into a required shape and applying primary vulcanization to the green tire 5 by heat denaturation of rubber. The tire vulcanizing press 2 may be of a bladderless type not having a bladder as shown in FIG. 4b adapted for loading the green tire 5 into each mold 9 and then blowing a heating medium to the inside of the green tire thereby applying primary vulcanization to the green tire 5 or may be adapted to apply primary vulcanization by urging a heated inner mold from the inside to the green tire.

Heating means for the green tire is not restricted only to those described in the present specification.

In FIG. 1, a secondary vulcanization means capable of applying secondary vulcanization to two primarily vulcanized tires 6 simultaneously is shown. The secondary vulcanization means has two secondary vulcanizing mechanisms 14 for applying secondary vulcanization to the primarily vulcanized tires 6 while utilizing the constitution of the post-cure inflator 3 disposed behind the tire vulcanizing press 2 as it is. Namely, each secondary vulcanization mechanism 14 is constituted with heat insulators 17 comprising a vessel main body 28 disposed to an upper rim 15 and a lid 29 disposed to a lower rim 16 for seizing the primarily vulcanized tire 6 therebetween and a heat source for adiabatically containing the primarily vulcanized tire 6 put between the upper and lower rims 15 and 16.

Each of the upper and lower rims 15 and 16 is disposed reversibly to each of a stand-by position P1 and a seizing position P2 around a reversing shaft 19 pivoted to a center frame 18 (refer to FIG. 2 and FIG. 3). Each of the positions P1 and P2 is reversed by rotating a reversing shaft 19 by a reversing cylinder and a link mechanism disposed to the center frame 18. Each upper rim 15 is attached by way of a seat 21 to the reversing cylinder 19 and disposed on each of the positions P1, P2. A concave 21a is formed to each seat 21.

Each lower rim 16 is attached to the seat 22 being opposed to each upper rim 15.

A locking shaft 23 which can be fitted to the concave 21a is disposed to each seat 22.

Then, the upper and lower rims 15 and 16 at each stand-by position P1 are integrated by the fitting of the concave 21a and the locking shaft 23 and seize the primarily vulcanized tire 6 therebetween. The lower rim 16 at each seizing position P2 is attached detachably by way of the seat 22 to a lifting frame 26. The lifting frame 26 is supported to a guide stand 25 moving vertically along the center frame 18 and moved vertically by a seizing cylinder 27 thereby enabling to seize or release the seizing of the primarily vulcanized tire 6 by the upper and lower rims 15 and 16 at each seizing position.

The heat insulator 17 has a structure capable of adiabatically containing and keeping the temperature of the primarily vulcanized tire 6 by fitting the lid 29 into the vessel main body 28 by way of a heat insulating seal 29a (O-ring). The vessel main body 28 is attached to the seat 21 of each upper rim 15 with the opening being opposed to each lower rim 16. In the heat insulator 17 of this constitution, when the upper and lower rims 15 and 16 are integrated at each seizing position P2, the lid 29 is fitted into the opening of the vessel main body 28 to form an adiabatic space for containing the primarily vulcanized tire 6 at the outer circumference of the upper and lower rims 15 and 16.

The secondary vulcanization mechanism 14 also serving as a post-cure inflator supports the primarily vulcanized tire 6 by the lower rim 15 at each seizing position P2 and accommodates and adiabatically seizes the primarily vulcanized tire 6 in the heat insulator 17 by the rising of the lifting frame 26. In this state, the primarily vulcanized tire 6 is inflated by exertion of an inner pressure, and the temperature of the primarily vulcanized tire 6 is kept, to thereby prevent dissipation of heat stored in the primary vulcanization, and secondary vulcanization is applied to the entire tire 6 including a portion of low vulcanization degree by the heat (autogenous heat) (refer to FIG. 5a).

Further, the post-cure inflator 3 as its inherent function flows cooling air from an air supply source 31 by opening an open/close valve 30 after secondary vulcanization for expanding and cooling the vulcanized tire 7 applied with secondary vulcanization (hereinafter referred to as a secondarily vulcanized tire 7). In this case, the inner pressure air sealed in the tire is also replaced with a cooling air (refer to FIG. 5b).

Secondary vulcanization for the primarily vulcanized tire 6 may be conducted at each seizing position P2 but may also be applied at each stand-by position P1 by reversing the primarily vulcanized tire 6 after adiabatically seizing the same.

The conveying means 4 comprises two conveying loaders 35 for conveying under rotation primarily vulcanized tires 6 and tires 8 cooled by the post-cure inflator 3 (hereinafter referred to as "cooled tire 8") between the tire vulcanizing press 2 and the post-cure inflator 3, and two discharge conveyers 37 for receiving the cooled tire 8 from each conveying loader 35 and discharging the same to a delivery conveyor 36 (refer to FIG. 1 and FIG. 2).

Each conveying loader 35 is disposed vertically movably and rotatably to a rearward center frame 12B of the tire vulcanizing press 2. Each conveying loader 35 has a tire chuck 35B at the top end of a rotary arm 35A. The tire chuck 35B has three or more fingers 35a diametrically extending or retracting in the radial direction (refer to FIG. 2) and grips each of the tires 6 and 8 at the upper bead part V by inserting and diametrically extending each finger 35a in the diametrically retracted state into each of the tires 6 and 8, and releases each of the tires 6 and 8 by diametrically contracting each finger 34a again. In this constitution, each conveying loader 35 grips the primarily vulcanized tire 6 from each mold 9 of the tire vulcanizing press 2 and conveys the tire under rotation to each seizing position P2 of the post-cure inflator 3 (refer to FIG. 1) to enter the secondary vulcanization. Further, when the secondary vulcanization step and the inflation/cooling step in the post-cure inflator have been completed, each conveying loader 35 grips the cooled tire 8 at each seizing position P2, and transports the same under rotation to each discharge position P3 in a rotating trace a between the post-cure inflator 3 and the tire vulcanizing press 2.

Each of the discharge conveyors 37 is situated below the discharge position P3 for each conveying loader 35 and disposed on the side of each seizing position P2 of the post-cure inflator. Further, each discharge conveyor 37 is disposed being inclined downwardly to the delivery conveyor 36 so as not to give undesired effects on the vertical movement of the lower rim 16 and the lid 29 at each seizing position P2. In such a constitution, each discharge conveyor 37 receives the cooled tire 8 conveyed under rotation by each conveying loader 35 at each discharge position P3 and slidingly guides the cooled tire 8 as far as the delivery conveyor 36 gravitationally and discharge the same. Further, the delivery conveyor 36 is disposed behind the post-cure inflator 3 and delivers the cooled tire 8 discharges from each discharge conveyor 37 to an inspection machine or a shipping place.

The tire vulcanization method in the tire vulcanizer 1 according to a preferred embodiment of the present invention is to be explained.

A green tire 5 is vulcanized and formed into a final tire product by applying partial vulcanization to the green tire 5 in the tire vulcanizing press 2 and then successively applying secondary vulcanization to the inner layer of the plimarily vulcanized tire 6 including unvulcanized portions (entire portion) by the secondary vulcanizing mechanism 14 utilizing the constitution of the post-cure inflator 3 as it is.

As shown in FIG. 4a, primary vulcanization in the tire vulcanizing press 2 is applied by loading the green tire 5 between each of molds 9, and inserting a bladder 13 simultaneously to the inside of the green tire 5. Successively, a pressurized heating medium is blown into the bladder 13 to urge the green tire 5 to the mold 9 and form it into a necessary shape, and primary vulcanization is applied by heat denaturation of rubber (primary vulcanizing step). Primary vulcanization may be applied also by using a bladderless type tire vulcanizing press 2 as shown in FIG. 4b.

The conditions of the primary vulcanization in the tire vulcanizing press 2 are determined based on a correlation between the degree of vulcanization to the green tire 5 (degree of vulcanization applied partially to the green tire 5), and the vulcanizing temperature and the vulcanizing time. The primary vulcanization conditions may be changed appropriately depending on the size of the tire.

The degree of vulcanization to the green tire 5 is determined to such an extent as not causing deformation of the primarily vulcanized tire 6 conveyed under rotation by each conveying loader 6 and to such a state that the amount of reaction gases generated by the vulcanizing reaction is decreased to some extent. That is, vulcanization is not applied approximately to 100% to the green tire 5 but, for instance, vulcanization is applied to a desired degree as far as the inner layer of a side wall part S of the green tire 5 (thin walled portion), while vulcanization is applied to a desired degree only to the surface layer for a tread part R or upper and lower bead parts V (thick walled portion).

The vulcanizing temperature is determined to such a level as not giving undesired effects on the primary vulcanization of the green tire 5 and capable of vulcanizing the green tire 5 with no deformation. Generally, since the temperature of the green tire 5 is rapidly elevated as the vulcanizing temperature goes higher, the vulcanizing reaction by denaturation of rubber is also promoted to shorten the vulcanizing time.

The vulcanizing time is determined by selecting an optimum vulcanizing temperature and then deciding the time that can apply primary vulcanization to the green tire 5 to such an extent as not causing deformation at the selected vulcanizing temperature.

When the primary vulcanizing step is completed, the primarily vulcanized tire 6 is discharged being gripped by each conveying loader 35 to the outside of the tire vulcanizing press 2 and conveyed under rotation to each seizing position P2 of the post-cure inflator 3. The primarily vulcanized tire 6 is conveyed while being suspended from each conveying loader 35 but it can be conveyed with no deformation since primary vulcanization has been applied.

Successively, each conveying loader 35 is lowered to support the primarily vulcanized tire 6 on the lower rim 16 at each seizing position P2, and then each conveying loader 35 is lifted and rotated to retract from each seizing position P2, and the process goes to the step of the secondary vulcanization. Also during conveyance by each conveying loader 35, vulcanization proceeds in the primarily vulcanized tire 6 by the heat given in the primary vulcanization (autogenous heat).

When the primarily vulcanized tire 6 transfers from the primary vulcanization to the secondary vulcanization, a new green tire 5 is loaded in each mold 9 of the tire vulcanizing press 2 and the process goes to the step of the prumary vulcanization, by which the primary vulcanization in the tire vulcanizing press 2 and the secondary vulcanization in the secondary vulcanizing mechanism 14 in the post-cure inflator 3 are conducted simultaneously in parallel.

Figure 5A:
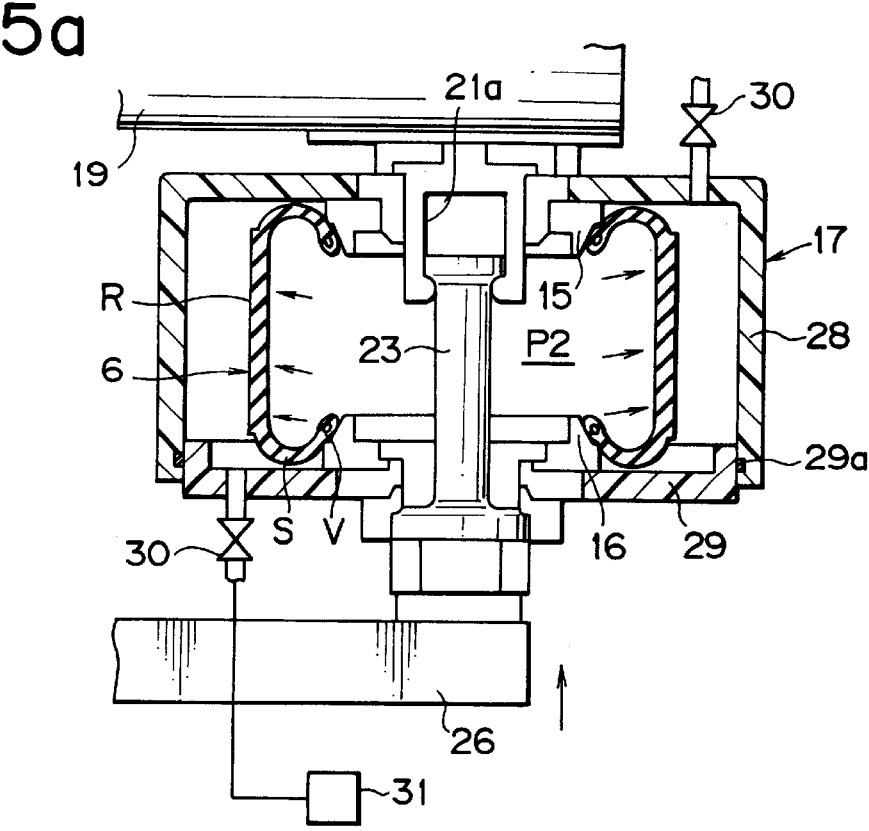
FIG. 5a and FIG. 5b are enlarged views each for a main portion showing the state of secondary vulcanization in a post-cure inflator.

In the secondary vulcanization by the secondary vulcanizing mechanism 14 in the post-cure inflator 3, the primarily vulcanized tire 6 is lifted together with the lower rim 16 at each seizing position P2 by the lifting frame 26 and each of the upper and lower rims 15 and 16 are integrated to adiabatically seize the primarily vulcanized tire 6 in the heat insulators 17 of the secondary vulcanizing mechanism 14 (refer to FIG. 5a). In this state, the primarily vulcanized tire 6 is kept at a temperature near the vulcanizing temperature attained by heating in the primary vulcanization step, and the temperature is elevated as far as the inner layer by the heat (autogenous heat) and the secondary vulcanization is applied (secondary vulcanizing step). In this step, air is sealed in the tire 6 with an aim of stabilizing the shape of the tire.

The degree of the secondary vulcanization is such that vulcanization is applied to the side wall part S (thin walled portion), as well as to the inner layer of the primarily vulcanized tire 6 including unvulcanized portions of the tread part R and the upper and lower bead parts V (thick walled portion) (entire portion). Since the vulcanizing temperature in the secondary vulcanization is lower than the vulcanizing temperature in the primary vulcanizing step, they are free from over cure. Further, the secondary vulcanizing step may be conducted not only at each seizing position P2 but also at each stand-by position P1 by adiabatically seizing the primarily vulcanized tire 6 at each seizing position P2 and then reversing the same. In this way, when secondary vulcanization is applied at each stand-by position P1, even if the vulcanizing time for the secondary vulcanization is longer than that for the primary vulcanization, since each seizing position P2 is not occupied, primary vulcanization and secondary vulcanization can be applied continuously for each tires 5 and 6.

Figure 5B:
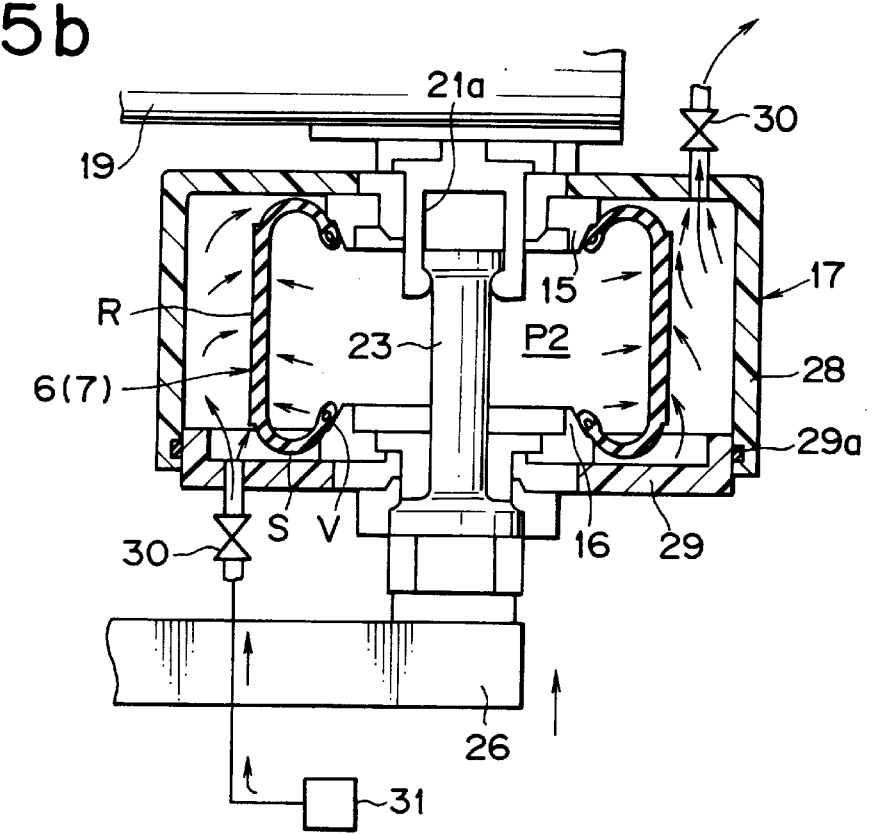

When the secondary vulcanization is completed, the open/close valve 30 is opened and a cooling air is caused to flow from the air supply source 31 to the inside of the heat insulators 17 to thereby inflate and cool the secondarily vulcanized tire 7 (refer to FIG. 5b). Further, the air sealed in the tire is also replaced with the cooling air in this step.

When the cooling is completed, the lower rin 16 at each seizing position P2 is lowered together with the cooled tire 8 by the lifting frame 26, to open the heat insulators 17 into a state allowing delivery. In this state, the cooled tire 8 is gripped by each conveying loader 35 and conveyed under rotation to a position above each discharge position P3 and handed to a position on each discharge conveyor 37.

The cooled tire 8 is lowered gravitationally by its own weight along each discharge conveyor 37 and discharged on the delivery conveyor 36 and then delivered by the delivery conveyor 36 to a tire inspection machine and a shipping place. Further, upon discharging the cooled tires 8 to the delivery conveyor 36, the discharge timing is adjusted such that the cooled tires 8 delivered successively to the delivery conveyor 36 are not overlapped with each other.

As described above, according to the tire vulcanization method and the tire vulcanizer of the present invention, since the vulcanization molding of the green tire 5 is not conducted entirely by the tire vulcanizing press 2, but vulcanization is applied separately in the primary vulcanizing step and the secondary vulcanizing step in which vulcanization is conducted to the green tire 5 and the primarily vulcanized tire 6 simultaneously in parallel, the time of keeping the tire to stay at one place is shortened and the cycle time of tire vulcanization (production cycle) can be shortened to improving the productivity.

Further, in the secondary vulcanizing step, if the temperature of the primarily vulcanized tire 6 is kept approximately to the vulcanizing temperature in the primary vulcanizing step, the vulcanizing reaction for the secondary vulcanization can be promoted.

Then, explanations are to be made with reference to FIG. 6 to FIG. 9 for the heating means attached to the heat insulators 17 for heating and elevating the temperature of the primarily vulcanized tire 6 to promote the vulcanizing reaction in the secondary vulcanizing step.

Figure 6:
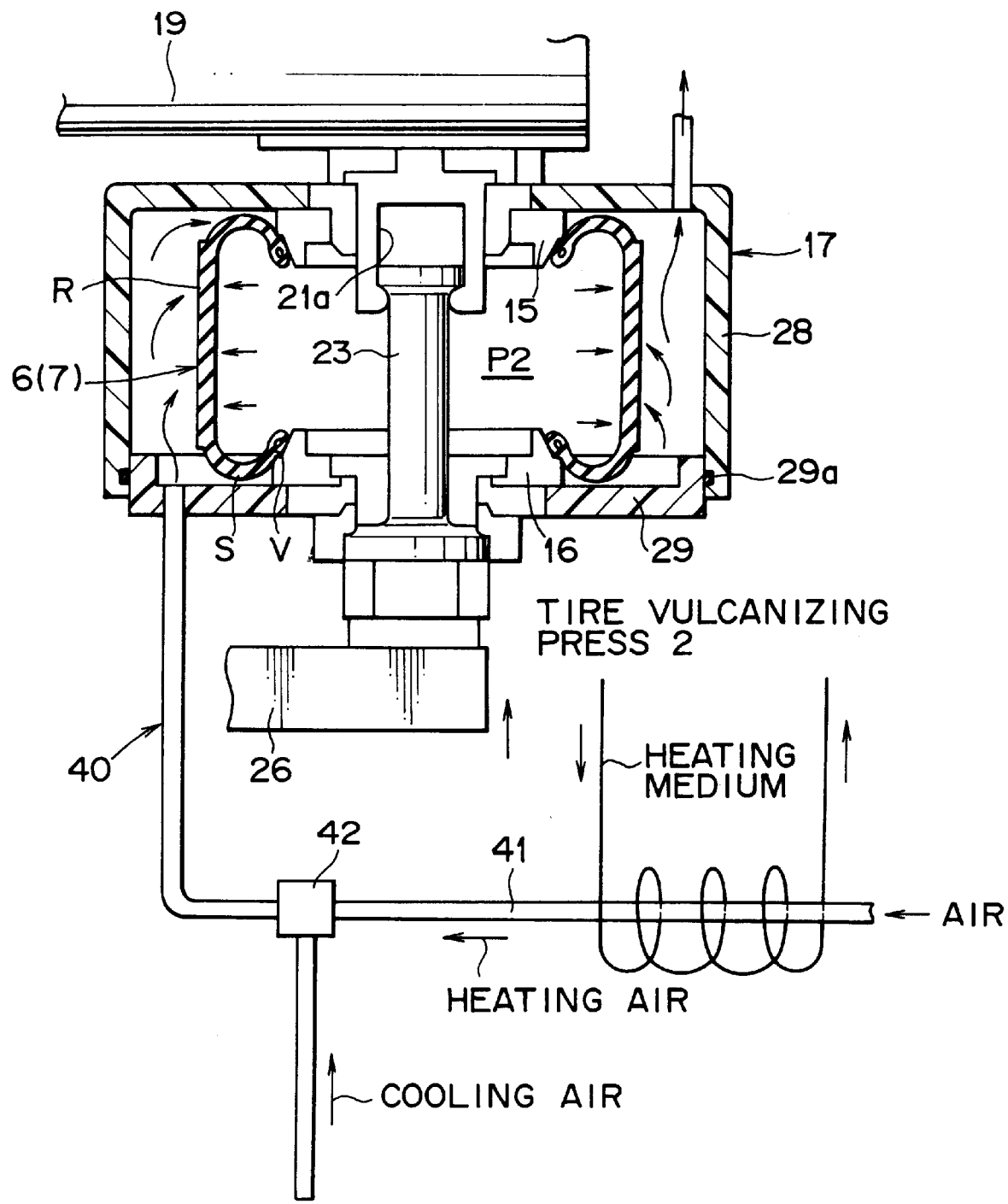
FIG. 6 is an enlarged view for a main portion showing a modified embodiment of a vulcanizing means in a post-cure inflator.

A heating means 40 shown in FIG. 6 is adapted for promoting the vulcanizing reaction by heating air utilizing a waste heat of a heating medium (heating medium used for the primary vulcanizing step) discharged from the tire vulcanizing press 2, and blowing the heated air through a pipeline 41 to the outer circumference of the primarily vulcanized tire 6 to heat and elevate the temperature thereof. Since the waste heat of the heating medium discharged in the primary vulcanizing step is utilized (recycling use), it is not necessary to additionally provide a heating device, and efficient heat utilization and energy saving are possible. Further, a switching valve 42 is disposed to the pipeline 41 and a cooling air is caused to flow by the switching valve 42 into the heat insulators 17 to inflate and cool the secondarily vulcanized tire 7.

Figure 7:
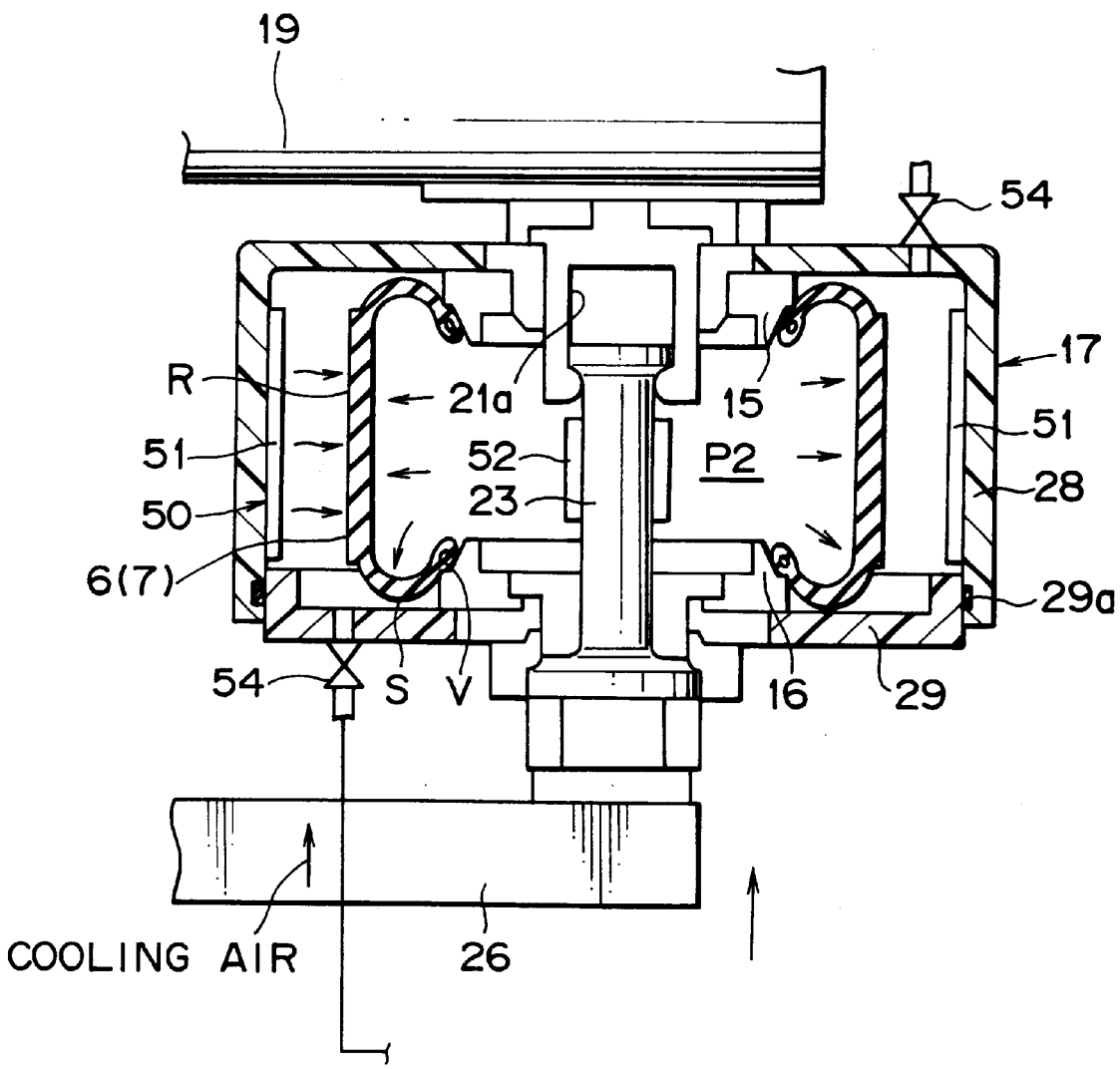
FIG. 7 is an enlarged view for a main portion showing a modified embodiment of a vulcanizing means in a post-cure inflator.

A heating means 50 shown in FIG. 7 is adapted for promoting the vulcanizing reaction by disposing heaters 51 and 52 (for example, infrared ray heater or ceramic heater) to the inner circumference of the heat insulators 17 and the outer circumference of the locking shaft 23 while being opposed to each other at the inner and the outer circumferences of the primarily vulcanized tire 6, and heating and elevating the temperature of the inner and the outer circumferences of the primarily vulcanized tire 6. Further, cooling air is caused to flow in the inside of the heat insulators 17 by opening an opening/close valve 54 to inflate and cool the secondarily vulcanized tire 7.

Figure 8:
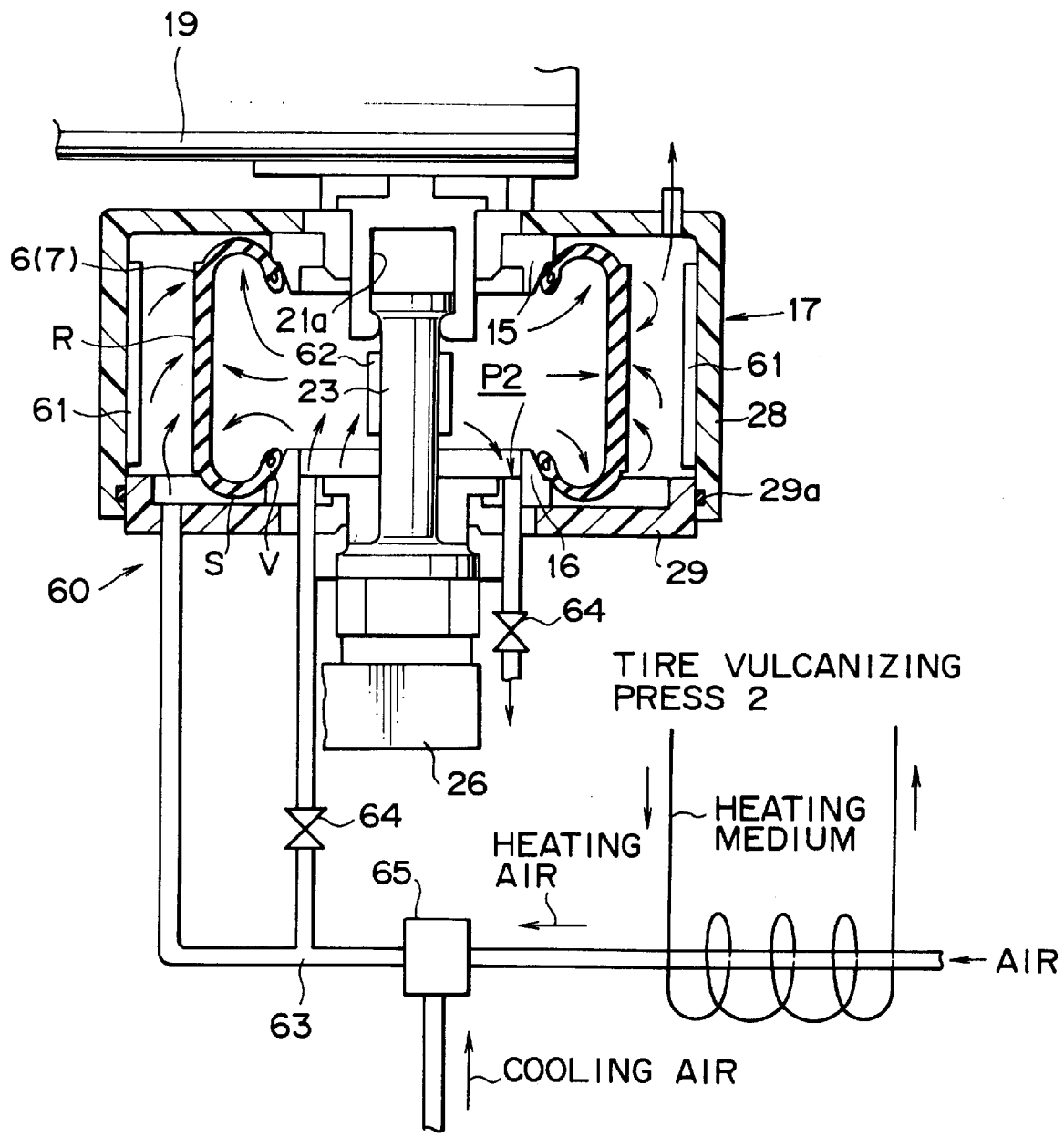
FIG. 8 is an enlarged view for a main portion showing a modified embodiment of a vulcanizing means in a post-cure inflator.

A heating means 60 shown in FIG. 8 is adapted for promoting the vulcanizing reaction by heating air utilizing a heating medium discharged from a tire vulcanizing press 2, blowing the heated air through a pipe line 63 to the inner and the outer circumferences of a primarily vulcanized tire 6 (inner and outer circumferences of a tread part R) to heat them and disposing heaters 61 and 62 (for example, infrared ray heater or ceramic heater) to the inner circumference of heat insulators 17 and the outer circumference of a locking shaft 23 while being opposed to each other at the inner and the outer circumferences of the primarily vulcanized tire 6, and heating the inner and the outer circumferences of the primarily vulcanized tire 6 by the heaters 61 and 62. Further, a switching valve 65 is disposed to the pipeline 63 and cooling air is caused to flow by the switching valve 65 into the heat insulators 17 to inflate and cool a secondarily vulcanized tire 7. Reference numeral 64 denotes an opening/closing valve disposed to a pipeline for causing heating air or cooling air to flow to the inner circumference of the primarily vulcanized tire 6.

When the primarily vulcanized tire 6 is heated to a temperature near the vulcanizing temperature by using the heating means shown in FIG. 6 to FIG. 8, vulcanizing reaction for the unvulcanized portions can be promoted without over cure. Accordingly, the vulcaniing time for the secondary vulcanization can be shortened to shorten the cycle time for the entire tire vulcanization thereby also improving the productivity. Particularly, vulcanizing reaction for a portion requiring much time for vulcanization can be promoted by heating the tread part R as the thick walled portion of the tire.

Further, as shown in FIG. 6 to FIG. 8, when air is heated by the heating medium exhausted from the tire vulcanizing press 2, there is no requirement for additionally providing an equipment for heating air and an energy-saving tire vulcanizer 1 can be provided while effectively utilizing the heat energy in the entire tire vulcanizer 1. However, the heating air is not restricted only to that formed by heating air by the heating medium discharged from the tire vulcanizing press 2.

Further, each of the heating means 40, 50 and 60 is not necessarily disposed to the heat insulators 17, but each of the heating means 40, 50 and 60 may be used alone for heating and elevating the temperature at the inner and the outer circumference (inner and outer circumference of the tread part R) of the primarily vulcanized tire 6.

Further, in the secondary vulcanizing step, when secondary vulcanization is applied to the primarily vulcanized tire 6, material such as noxious gases or rubber dusts are formed by the reaction. If the materials are discharged as they are directly from the inside of the heat insulators 17 to the outside, they give undesired effects on the external environment. Accordingly, it is preferred to recover/remove materials generated in the secondary vulcanization step as shown in FIG. 9.

Figure 9:
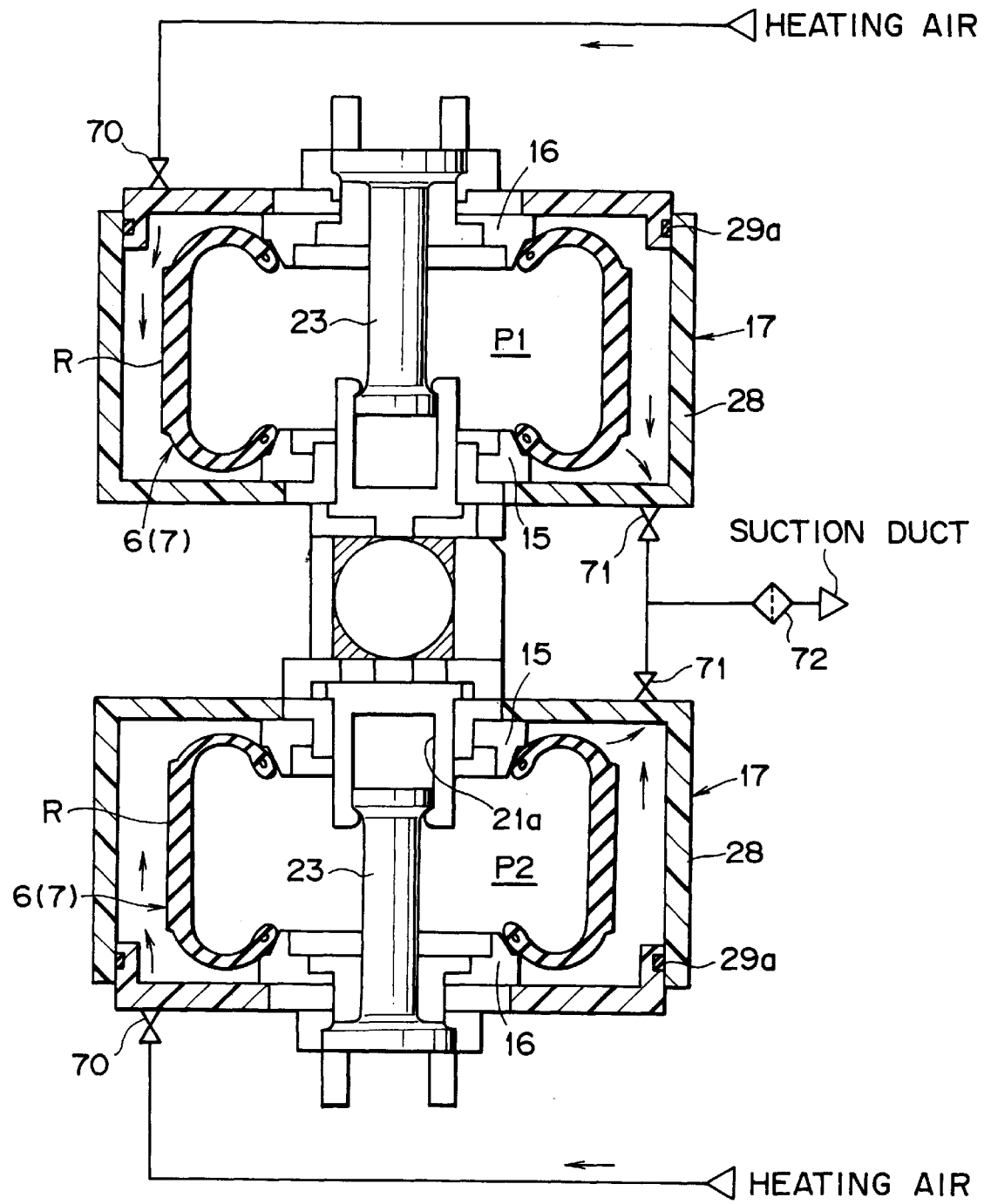
FIG. 9 is an enlarged view for a main portion showing a modified embodiment of a vulcanizing means in a post-cure inflator.

Heat insulators 17 shown in FIG. 9 comprise a suction duct 71 for leading gases or rubber dusts from the inside to the outside, in addition to an opening/closing valve 70 for introducing heating air heated by the same heating means 40 and 60 as shown in FIG. 6 or FIG. 8. The suction duct 71 is connected with a filter 72 capable of recovering/removing gases or tars. In this constitution, since the gases and rubber dusts generated in the secondary vulcanizing step can be recovered/removed effectively by the filter 72, and discharged to the outside, no undesired effects are given to the external environment.

For the tire vulcanization method and the tire vulcanizer 1 according to the present invention, explanations have been made to the embodiment of conducting the secondary vulcanizing step by the post-cure inflator 3 but the invention is not restricted only thereto and heating/vulcanizing means may be disposed also to the outside of the tire vulcanizing press 2.

In this case, it is provided a vulcaning means of the same constitution as that of the post-cure inflator 3, having upper and lower rims 15 and 16 capable of seizing the primarily vulcanized tire 6 and heat insulators 17 capable of adiabatically accommodating the thus seized primarily vulcanized tire 6, and having a function capable of sealing and pressurizing air into the seized primarily vulcanized tire 6. In this constitution, primary vulcanization and secondary vulcanization can be conducted simultaneously in parallel, and the vulcanizing time in the secondary vulcanization can be shortened by the additional disposition of the heating means 40, 50 and 60 to shorten the vulcanizing time in the secondary vulcanization and shorten the cycle time for the entire tire vulcanization thereby enabling to improve the productivity in the same manner as explained for the post-cure inflator 3.

Further, explanations have been made for the secondary vulcanizing step regarding the application of the secondary vulcanization by heating or keeping the temperature of the primarily vulcanized tire 6, it is not always restricted so depending on the size of the tires. Namely, in a large sized thick wall tire used, for example, in a truck or bus, since the shape of the tire is substantially determined in the primary vulcanization by the tire vulcanizing press 2, the tire suffers from less deformation even if the primarily vulcanized tire is not seized and inflated upon conduction of the primary vulcanization. Accordingly, in a large sized tire, after the primary vulcanizing step by the tire vulcanizing press 2, the tire can be handed by each conveying loader 35 directly to a position on each discharge conveyor 37 and applied with secondary vulcanization by the heat from the primary vulcanization on the conveying conveyor (secondary vulcanizing means), followed by cooling.

As described above, whether the primarily vulcanized tire 6 is adiabatically seized and inflated or not in the secondary vulcanization is determined optionally and selectively depending on the size of tires.

Further, while explanations have been made such that the secondarily vulcanized tire is cooled by the post-cure inflator 3 but the invention is not limited only thereto. Since the shape of the secondarily vulcanized tire has been determined, it may be delivered by each conveying loader 35 immediately after the secondary vulcanization in the post-cure inflator 3, handed to each discharge conveyor 37, and then spontaneously cooled or cooled by compulsorily blowing cooling air on the delivery conveyor 36. Further, an additional device for cooling may be disposed and the secondarily vulcanized tire 7 may be seized by the cooling device and spontaneously cooled by inflation or compulsorily cooled by blowing cooling air compulsorily.

Figure 10A:
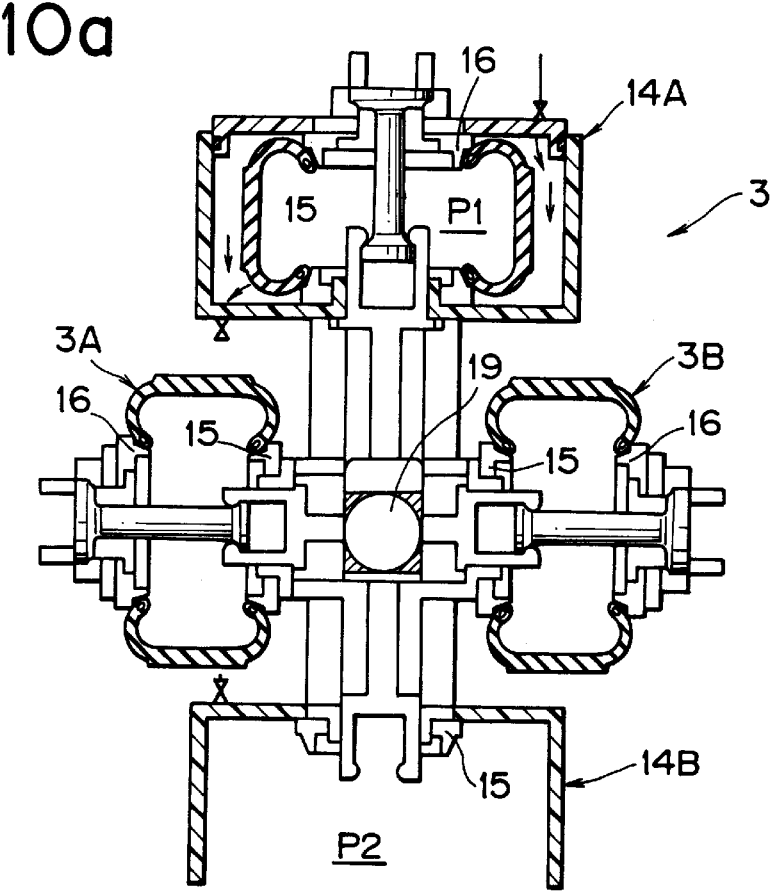
FIG. 10a and FIG. 10b are enlarged views each for a main portion showing a modified embodiment of a vulcanizing means in a post-cure inflator.
Figure 10B:
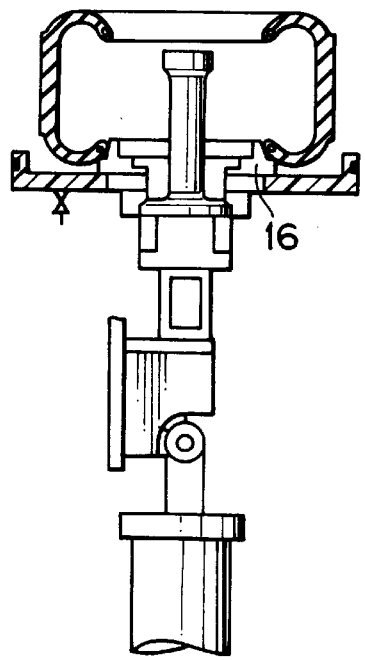
Figure 11:
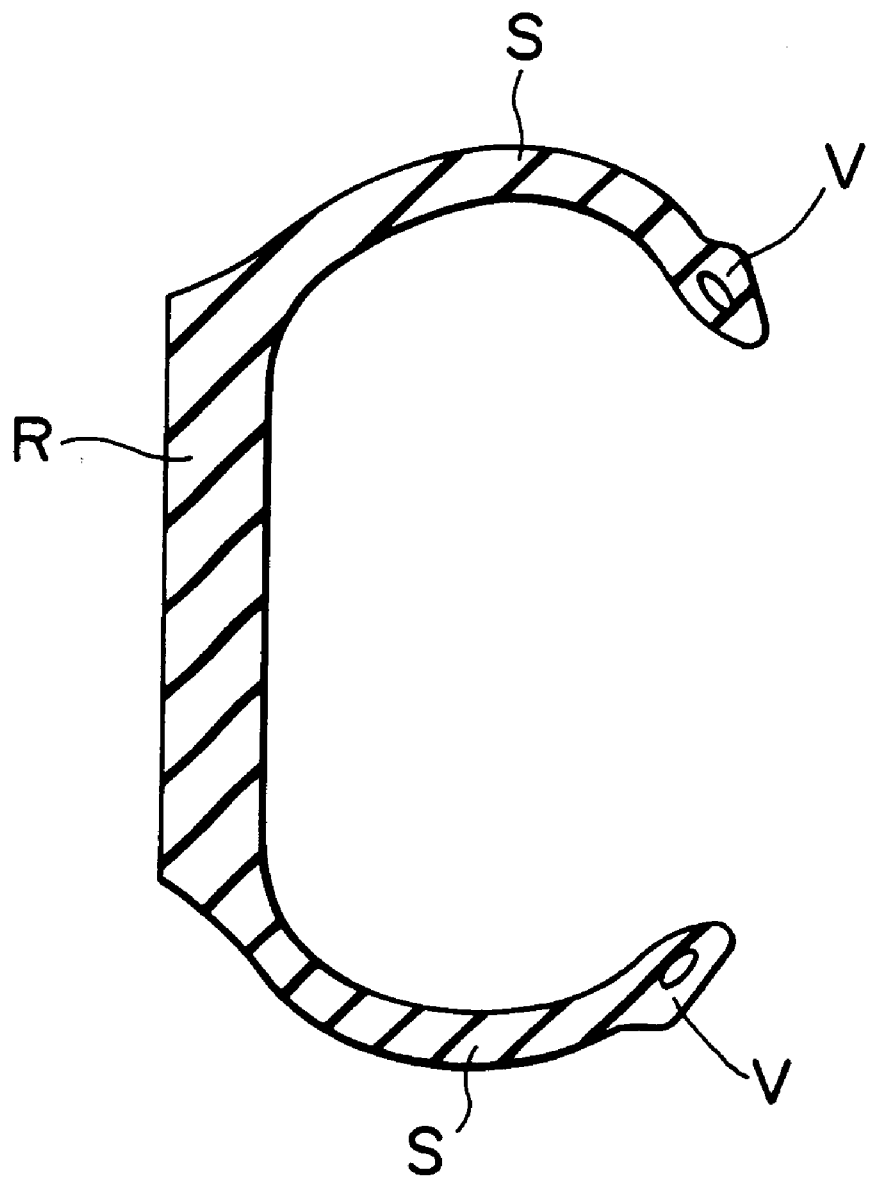
FIG. 11 is a schematic view showing a cross section of a green tire.

Furthermore, as a modified embodiment of simultaneously conducting the secondary vulcanizing step and the cooling step in the post-cure inflator 3, a constitution shown in FIG. 10 may be adopted.

A post-cure inflator 3 shown in FIGS. 10 comprises four sets of upper and lower rims 15 and 16 disposed radially at four positions around a reversing shaft 19. Two out of four positions are used for the secondary vulcanizing mechanisms 14A and 14B for conducting the secondary vulcanizing step and the other two positions are used for cooling means for conducting inflation/cooling. The secondary vulcanizing mechanisms 14A and 14B have the heat insulators 17 and the heating means 40 as shown in FIG. 1 to FIG. 8.

With the constitution described above, the primarily vulcanized tires 6 continuously applied with primary vulcanization are transported from the tire vulcanizing press 2 to the post-cure inflator 3, and continuous secondary vulcanizing step and cooling step can be conducted by the rotation of the reversing shaft 19.

Furthermore, for shortening the vulcanizing time in the primary vulcanizing step by the tire vulcanizing press 2, vulcanization may also be promoted, for example, by heating the inner circumference of the green tire 5 in each mold 9 by a heater (infrared ray heater).

While the invention has been described in detail and with a reference to specific embodiments thereof, it will be apparent to one skilled in the art that various changes and modifications can be made therein without departing from the spirit and the scope thereof.

The entire disclosure of Japanese Patent Application No. 10-134911 filed on May 18, 1998 including specification, claims, drawings and summary are incorporated herein by reference in its entirety.

I claim:

1. A tire vulcanization method comprising the following steps of heating a green tire and applying primary vulcanization to the green tire by a tire vulcanizing press; and then,
    applying secondary vulcanization to the primarily vulcanized tire at the outside of the tire vulcanizing press, wherein the temperature of the primarily vulcanized tire is adiabatically kept in the secondary vulcanization.

2. A tire vulcanization method as defined in claim 1, wherein the primarily vulcanized tire is heated to raise the temperature thereof in the secondary vulcanization.

3. A tire vulcanization method as defined in claim 1, wherein materials generated from the vulcanizing reaction of the primarily vulcanized tire are recovered/removed in the secondary vulcanization.

4. A tire vulcanization method as defined in claim 1, wherein the secondarily vulcanized tire is cooled after the secondary vulcanization.

5. A tire vulcanizer comprising:
    a tire vulcanizing press having a heating means for heating a green tire and applying primary vulcanization to the green tire; and
    a secondary vulcanizing means disposed to the outside of the tire vulcanizing press for applying secondary vulcanization to the primarily vulcanized tire, wherein the secondary vulcanizing means has a temperature keeping means for adiabatically keeping the temperature of the primarily vulcanized tire.

6. A tire vulcanizer as defined in claim 5, wherein the secondary vulcanizing means has a heating means for heating and elevating the temperature of the primarily vulcanized tire.

7. A tire vulcanizer as defined in claim 6, wherein the heating means is a heater opposed to the primary vulcanized tire.

8. A tire vulcanizer as defined in claim 5, wherein the secondary vulcanizing means has a means of recovering/ removing materials generated by the vulcanizing reaction of the primarily vulcanized tire.

9. A tire vulcanizer as defined in claim 5, further comprising cooling means for cooling the secondarily vulcanized tire disposed separately from or integrally with the secondary vulcanizing means.

10. A tire vulcanizer as defined in claim 9, wherein the secondary vulcatiing means has a plurality of vulcanizing positions capable of applying secondary vulcanization to a plurality of plurality vulcanized tires, and a portion of the vulcanizing positions is used also as the cooling means.

11. The tire vulcanizer of claim 5, including a heater positioned opposite a tread portion of the tire.

12. The tire vulcanizer of claim 11, wherein the heater comprises means for blowing heated air onto the tread portion of the tire.

13. The tire vulcanizer of claim 11, wherein the heater comprises a ceramic heater.

14. The tire vulcanizer of claim 11, wherein the heater comprises an infrared heater.

15. A tire vulcanizer comprising:
   a tire vulcanizing press having a heating means for heating a green tire and applying primary vulcanization to the green tire; and
   a secondary vulcanizing means disposed to the outside of the tire vulcanizing press for applying secondary vulcanization to the primarily vulcanized tire, wherein the secondary vulcanizing means has a heating means for heating and elevating the temperature of the primarily vulcanized tire,
   wherein the heating means has an air supply means for blowing air heated by a heat energy of a waste gas exhausted from the tire vulcanizing press to the primarily vulcanized tire for heating and temperature elevation.

16. A tire vulcanizer comprising:
   a tire vulcanizing press having a heating means for heating a green tire and applying primary vulcanization to the green tire; and
   a secondary vulcanizing means disposed to the outside of the tire vulcanizing press for applying secondary vulcanization to the primarily vulcanized tire, wherein the secondary vulcanizing means has a heating means for heating and elevating the temperature of the primarily vulcanized tire,
   wherein the heating means comprises means for heating air heated by the heat energy of waste gases exhausted from the tire vulcanizing press and blown to the primarily vulcanized tire and a heater opposed to the primarily vulcanized tire.

17. A tire vulcanizer comprising:
   a tire vulcanizing press having a heating means for heating a green tire and applying primary vulcanization to the green tire; and
   a secondary vulcanizing means disposed to the outside of the tire vulcanizing press for applying secondary vulcanization to the primarily vulcanized tire,
   wherein the secondary vulcanizing means has a means for recovering/removing materials generated from the vulcanizing reaction of the primarily vulcanized tire, and a temperature keeping means for adiabatically keeping the temperature of the primarily vulcanized tire.

18. A tire vulcanizer comprising:
   a tire vulcanizing press having a heating means for heating a green tire and applying primary vulcanization to the green tire; and
   a secondary vulcanization means disposed outside of the tire vulcanizing press for applying secondary vulcanization to the primarily vulcanized tire, wherein the secondary vulcanizing means has a temperature keeping means for adiabatically keeping the temperature of the primarily vulcanized tire,
   further comprising cooling means for cooling the secondarily vulcanized tire disposed separately from or integrally with the secondary vulcanizing means.

19. A tire vulcanizer as defined in claim 18, wherein the secondary vulcanizing means has a plurality of vulcanizing positions capable of applying secondary vulcanization for a plurality of primarily vulcanized tires, and a portion of the vulcanizing positions is used also as the cooling means.

20. A tire vulcanizer comprising:
   a tire vulcanizing press having a heating means for heating a green tire and applying primary vulcanization to the green tire;
   a secondary vulcanizing means disposed to the outside of the tire vulcanizing press for applying secondary vulcanization to the primarily vulcanized tire, wherein the secondary vulcanizing means has a temperature keeping means for adiabatically keeping the temperature of the primarily vulcanized tire; and
   a heater positioned in opposition to the primarily vulcanized tire.

* * * * *